(12) United States Patent
Sundararajan et al.

(10) Patent No.: US 8,307,339 B2
(45) Date of Patent: Nov. 6, 2012

(54) SOFTWARE REUSE IN MODEL BASED SOFTWARE SYSTEMS

(75) Inventors: Parthasarathy Sundararajan, Tamil Nadu (IN); Srinivasan Ramaswamy, Tamil Nadu (IN); Rajagopalan Sethuraman, Tamil Nadu (IN); Raghuram Devalla, Tamil Nadu (IN)

(73) Assignee: Ramco Systems Limited, Chennai, Tamil Nadu (IN)

( * ) Notice: Subject to any disclaimer, the term of this patent is extended or adjusted under 35 U.S.C. 154(b) by 1520 days.

(21) Appl. No.: 11/065,007

(22) Filed: Feb. 24, 2005

(65) Prior Publication Data

US 2005/0203942 A1    Sep. 15, 2005

Related U.S. Application Data

(60) Provisional application No. 60/553,091, filed on Mar. 15, 2004, provisional application No. 60/553,089, filed on Mar. 15, 2004, provisional application No. 60/553,088, filed on Mar. 15, 2004.

(51) Int. Cl.
    G06F 9/44    (2006.01)
(52) U.S. Cl. ........................................... 717/120
(58) Field of Classification Search .................. 717/100, 717/107–116, 120–123, 174
    See application file for complete search history.

(56) References Cited

U.S. PATENT DOCUMENTS

| | | | | |
|---|---|---|---|---|
| 5,590,270 A | * | 12/1996 | Tsukuda et al. | 717/121 |
| 5,632,022 A | * | 5/1997 | Warren et al. | 715/776 |
| 5,724,589 A | * | 3/1998 | Wold | 719/318 |
| 6,122,757 A | * | 9/2000 | Kelley | 714/39 |
| 6,243,851 B1 | * | 6/2001 | Hwang et al. | 716/10 |
| 6,292,938 B1 | * | 9/2001 | Sarkar et al. | 717/138 |
| 6,293,933 B1 | * | 9/2001 | Ahlstrand | 604/385.101 |
| 6,346,945 B1 | * | 2/2002 | Mansurov et al. | 345/473 |
| 6,427,230 B1 | * | 7/2002 | Goiffon et al. | 717/108 |
| 6,601,234 B1 | * | 7/2003 | Bowman-Amuah | 717/108 |
| 6,678,882 B1 | * | 1/2004 | Hurley et al. | 717/121 |
| 6,694,505 B1 | * | 2/2004 | Tan | 717/100 |
| 6,748,588 B1 | * | 6/2004 | Fraser et al. | 717/146 |
| 6,851,105 B1 | * | 2/2005 | Coad et al. | 717/106 |
| 7,096,200 B2 | * | 8/2006 | Wang et al. | 705/50 |

(Continued)

FOREIGN PATENT DOCUMENTS

CA    2254494    *    5/2000

(Continued)

OTHER PUBLICATIONS

Schmidt, Douglas C., "Using Design Patterns to Develop Reusable Object-Oriented Communication Software," Oct. 1995, ACM, p. 65-74.*

(Continued)

*Primary Examiner* — Wei Zhen
*Assistant Examiner* — Qing Chen
(74) *Attorney, Agent, or Firm* — Prakash Nama; Global IP Services, PLLC

(57) ABSTRACT

In a model based software system, a set of business rules is scanned, and patterns are identified. The patterns are then compared, and similarities identified which indicate that software can be reused in the system. In one embodiment, identifiers of the rules are scanned. In another embodiment, usage patterns are used for designing a middle layer and generating code. In another embodiment of the invention, a data model is generated by capturing data from a user interface for a business document.

28 Claims, 2 Drawing Sheets

U.S. PATENT DOCUMENTS

| | | | | |
|---|---|---|---|---|
| 7,149,734 | B2 * | 12/2006 | Carlson et al. | 707/6 |
| 7,171,646 | B2 * | 1/2007 | Charisius et al. | 717/100 |
| 7,197,740 | B2 * | 3/2007 | Beringer et al. | 717/108 |
| 7,322,024 | B2 * | 1/2008 | Carlson et al. | 717/120 |
| 7,562,347 | B2 * | 7/2009 | Baumgart et al. | 717/120 |
| 7,631,299 | B2 * | 12/2009 | Kannenberg | 717/121 |
| 7,685,563 | B2 * | 3/2010 | Kumar et al. | 717/107 |
| 2003/0158760 | A1 * | 8/2003 | Kannenberg | 705/4 |
| 2004/0172612 | A1 * | 9/2004 | Kasravi et al. | 717/101 |

FOREIGN PATENT DOCUMENTS

| | | |
|---|---|---|
| WO | 0031626 | 6/2000 |
| WO | 0125860 | 4/2001 |
| WO | 03005243 | 1/2003 |

OTHER PUBLICATIONS

Schmidt et al., "Software Patterns," Oct. 1996, ACM, p. 36-39.*

Ram et al., "A Pattern Oriented Technique for Software Design," Jul. 1997, ACM, p. 70-73.*

Cinnéide et al., "Automated Software Evolution Towards Design Patterns," Sep. 2001, ACM, p. 162-165.*

Zaremski Am et al: "Specification Matching of Software Components" ACM Transactions on Software Engineering and Methodology, Association for Computing Machinery, New York, US, vol. 6, No. 4, Oct. 1, 1997, pp. 333-369, XP000755126, ISSN: 1049-331X , abstract.

* cited by examiner

SOFTWARE REUSE IN MODEL BASED SOFTWARE SYSTEMS

RELATED APPLICATIONS

Benefit is claimed under 35 U.S.C. 119(e) to U.S. Provisional Application Ser. No. 60/553,091, entitled "User Interface Driven Data Modeling Approach" by inventor Sundararajan Parthasarathy et al., filed Mar. 15, 2004, which is herein incorporated in its entirety by reference for all purposes.

Benefit is claimed under 35 U.S.C. 119(e) to U.S. Provisional Application Ser. No. 60/553,089, entitled "An Approach to Identify Software Re-Use in a Model Based Software Solution" by inventor Raghuram Devalla et al., filed Mar. 15, 2004, which is herein incorporated in its entirety by reference for all purposes.

Benefit is claimed under 35 U.S.C. 119(e) to U.S. Provisional Application Ser. No. 60/553,088, entitled "A Formal Approach to Design Generation of Multi-tier Applications Using Behavior Patterns" by inventor Rajagopalan Sethuraman et al., filed Mar. 15, 2004, which is herein incorporated in its entirety by reference for all purposes.

FIELD OF INVENTION

The present invention relates to model based software systems, and in particular, user interfaces and the reuse of software in such model based systems.

BACKGROUND OF INVENTION

Model based software solutions involve approaches and implementations in which every significant part of a software development lifecycle is modeled as data and persisted with capabilities that enable a user to perform various steps in the software development lifecycle. This data modeling requires a high level of specialization, and is usually carried out just before the start of coding. The modeled data is persisted and can be used by downstream processes thereby ensuring that all relevant data that is captured by upstream processes are used in downstream processes without any significant loss of information.

The traditional approach to data modeling involves an understanding of the system in its entirety including all the data dependencies between various entities in the system. A schema designer who models data requires detailed information on the various business processes addressed by the system and the various constituents of the system. For example, the designer requires information in terms of the entities that need to be stored in the system and their relationship with other data that are to be stored in the system. The data types and sizes of those entities also need to be stored.

This schema can then be represented diagrammatically and reviewed by functional specialists. As the number of entities increase, their interconnections with other entities also increase thereby increasing the complexity of the schema. A fully represented schematic diagram for a fairly complex system has many interconnections that explain the origin and destination of the relationship lines between entities.

The granularity of data captured in a model based environment depends on the extent that the model is used. For example, if the functional requirements are captured at a very granular level, it will enable a designer to implement these requirements with the exact business logic as envisioned by a requirements engineer.

During a typical modeling process, business logic that is captured at one point in a system is quite often applicable at some other point in the system. However, because of the granularity of the business logic, the set of business rules that may be needed to be reused may not be a single rule but a set of business rules which may form a subset of the business logic implemented elsewhere. Even though these business rules are not reused by the requirements engineer, the design engineer who analyzes them will benefit if he can identify the reuse of business rules across the various actions. Unfortunately, the task of identifying this subset of the huge set of business rules that exist in the business process is time consuming and strenuous. This makes reuse identification a near impossibility for the design engineer.

DETAILED DESCRIPTION OF EMBODIMENTS

Figure 1:
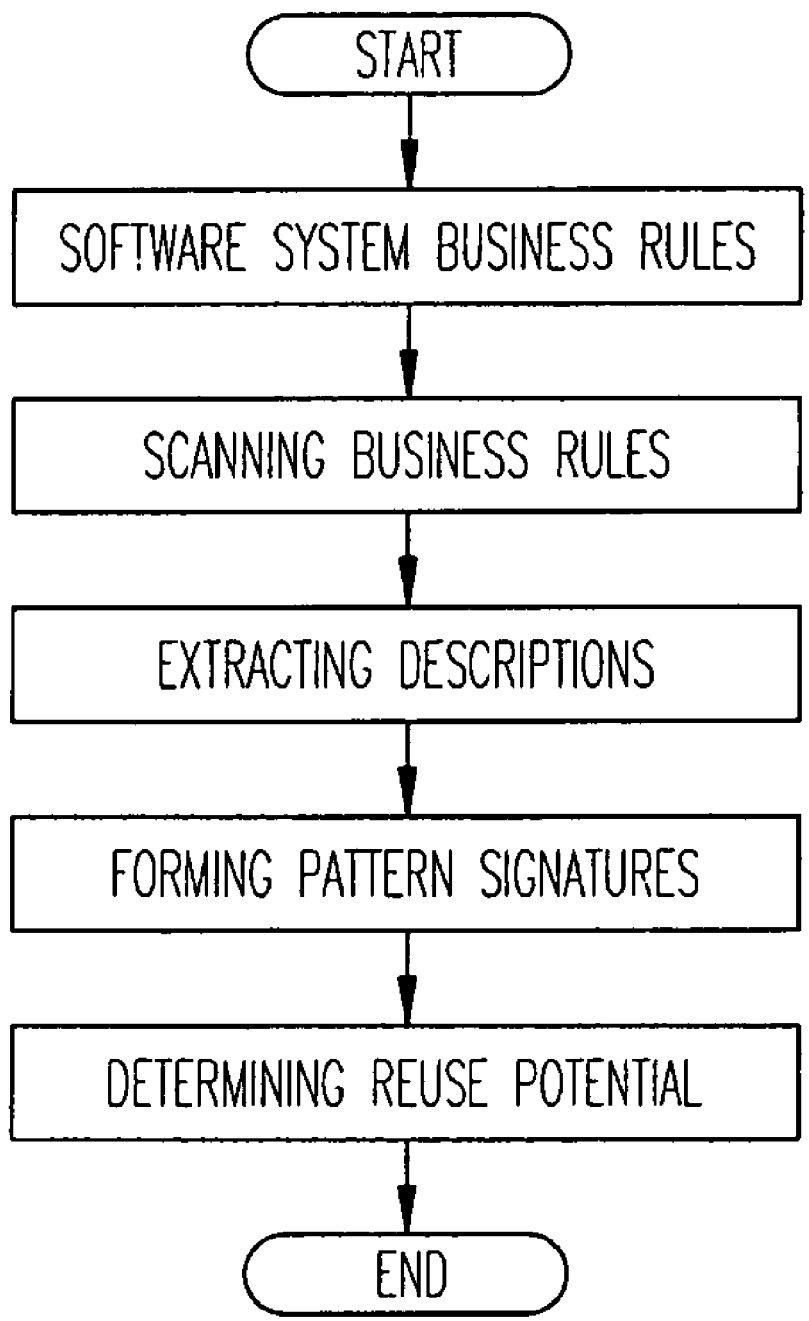
FIG. 1 is a flow chart of an embodiment of the invention.

Any software solution is a collection of user interfaces between a user and a repository where the user's data are stored. These interfaces could be displays, reports, and/or devices such as scanners and readers.

Any such interface can be visualized as a business document with a header section that uniquely identifies the business document. A business document further has various sections each of which captures related data at various stages in the lifecycle of the business document. Such business documents also refer to other documents for information relating to certain key data items in the document. These could be references to the external documents or data copied from the relevant business documents.

The usual approach of designing user interfaces is to capture data for an underlying business in various stages. Each stage adds value to the data that has been already captured. At each of these stages the data captured has direct relevance to the business document that has been considered for automation.

In an embodiment of the invention, a user interface will normally have several types of elements. There are single instance user interface elements such as edit controls, check boxes and text areas. There are also multiple instance data sets that reflect the various constituents of the business document. These normally reflect the table of data that is present in the documents, and are incorporated in the user interfaces as grid controls. Also, there are single instance data items that have a predefined list of values of which one can be selected for a particular instance of a business document. These are incorporated in the user interface as Combo Boxes or List controls. Additionally, sets of single instance data items are present as elements, some or all of which could be applicable for the instance of the business document. These can be incorporated as a group of check boxes. There are also non-editable user elements that reflect the various business states in which a document can exist at any point in time. These are typically incorporated as display only controls. And there are links to other user interfaces that reflect the references to other business documents that could be referred to for additional information. These may be incorporated as hyperlinks or command buttons that invoke other user interfaces by passing the required context information. Lastly, there are reference data items that reflect data that are copied from other business documents and are displayed in the user interface. These are incorporated as display only controls in the user interface.

After establishing the methodology of mapping various user elements to probable business documents, the data model is formed for the business document. A business object (BO) represents the business document, and an interface business object (IBO) refers to the business documents from where the information is acquired. Both business objects and interface business objects have data segments that refer to the various sections of business documents and related business documents. Each data segment has a unique identifier which uniquely identifies an instance of data in the data segment. A hierarchy of data segments can also be established. This can be accomplished by specifying a parent segment to each data segment. A data item of a data segment could be owned by the data segment itself or be present as a reference to another interface business object, a data segment, or a data item.

In an embodiment, factors that affect such a business object hierarchy are as follows. First, every collection of related user interfaces will form a business object. Second, every related collection of referred user interfaces will form an interface business object. Third, every section in the user interface is a data segment. Fourth, any list of values is a data segment from an interface business object. Fifth, any display only field that displays data from other collections is not stored as data but refers to the corresponding data in the interface business objects. Recording the corresponding interface business object, segment, and data items will depict such relations.

In another embodiment, a database schema can be derived out of this structure of business objects and interface business objects. The physical representation of this embodiment is as follows. Every data segment is represented as database tables, and each of these tables has a primary key formed by the identifier that is a part of the segment and the identifiers of its parent segments. Foreign keys are identified for any data items that refer to interface business objects. Every data segment of an interface business object can be represented as database views or database stored procedures. The data items of the data segment are columns for the corresponding database tables. The data items of the interface business objects will be the columns of the corresponding database views or the parameters of the database stored procedures used for integration. This embodiment directly attempts to arrive at a fairly comprehensive database schema that can be further refined for any specific database requirements such as audit trail and concurrency control implications. This embodiment provides a direct relationship of the schema to the user interface, an intuitive approach to database design that enables a high level of consistency with the user interface, and a quick first cut schema to facilitate overall understanding of the business functionality.

In another embodiment, every function in the system has a set of business rules, and a group of business rules is associated with a particular action performed by an end user. These groups can be completely or partially used as part of another task. Identifying this set of business rules is the challenge for the design engineer. In this embodiment, there are two categories of reuse. First, there are a set of rules in which their identification markers repeat across other actions. Second, there are a set of rules that, after considering the contents of the business rules, repeat across other actions. In either instance however, the repetition indicates the possibility of reuse.

In an embodiment, each distinct action is considered. For each action, a sequential scan is made from the first business rule to the last business rule. As the scan progresses the system forms a pattern signature that uniquely identifies the business rules encountered so far in the sequence. The result is that at the end of this step each action will have a pattern signature associated with it.

Thereafter, each task is again considered. A scan is made through the pattern signature to identify if any part of the signature occurs in the pattern signature of the other actions. If such an occurrence is made then the subset is identified as a pattern and recorded separately along with its occurrences.

This process is continued for all actions. If in this process a pattern is identified that consists of other patterns, then this pattern hierarchy is also maintained. At the end of this process the system has data in terms of the various patterns and their occurrences.

A designer then analyzes this data, and identifies the best possible reuse(s). There are several points that a designer may consider in this process. First, a designer may want to maximize business rule reuse by selecting a pattern with the maximum size, irrespective of its occurrences. The advantage of this approach is that the designer can identify bigger chunks of business logic that can be implemented across the system. Second, a designer may choose to maximize occurrence reuse by selecting patterns that cover the maximum number of actions. This embodiment permits a designer to reduce design effort by spreading the effort over a greater number of tasks. Since the reuse is high with this embodiment, adequate care could be exercised in designing for such patterns. Third, a designer could maximize the total number of business rules that need not be designed for as a result of pattern reuse. This embodiment ensures that the maximum amount of patterns that can be reused has been extracted thereby reducing the overall design effort.

In several embodiments, various aspects may be considered before finally arriving at the patterns whose reuses are to be adopted. One such consideration is that as a pattern size is reduced, the reuse of that pattern becomes trivial. That is to say, certain business rules repeat in all actions and are trivial in nature. These should be reused only if it gives a significant benefit for the designers. Reusing patterns that have a negligible business rule count could result in a design overhead that would impact the overall size and effectiveness of the solution.

In an embodiment, in the process of identifying the pattern signature, the description of the business rule is considered. First, the white spaces and special characters other than numerical operators are removed. The actions are then analyzed and pattern signatures formed for every action. Then once the pattern signature is formed, the reuse identification process is similar to that of the embodiment of the first approach.

The advantage of this approach is that it relies on the content of the business rule rather than the identifier of the business rule. While in all likelihood this will be a more time consuming process as the operations have to be carried out on the business rule descriptions (rather than just the identifiers), the result may be more effective than that obtained from the other approach (since it is based on the description which by design holds more information). The approach a user adopts depends on the user's needs and the satisfaction level he obtains in analyzing the reuse in each of the approaches. The process flow is illustrated in FIG. 1.

These approaches to identifying reuse in a model based environment have several advantages. First, there is a tremendous saving of time as a majority of the operations described can be automated. Second, the embodiments are highly effective as each and every business rule is analyzed and all the various combinations are identified. Third, there is a significant saving of design effort as patterns identified will result in decreased design effort leading to a reduction in the construction efforts also.

In another embodiment of the invention, a specification repository captures extensive information on the interfaces and sequence of actions that are needed at different layers. This is a humungous task when there is a need to develop and deploy software systems that involve hundreds of business components and/or functions. This embodiment then abstracts interfaces and action sequences based on the expected response of the system. This abstraction is based on the study of different user actions and the expected behavior of the system in response, and also the participating user interface elements. The expected response of the system is captured as a set of specification data for each action.

Each user action is associated with the user interface information that influences the behavior, and each user action is modeled as a different variety of action based on the expected behavior of the system. For example, a user interaction may be modeled as a document fetch type if the action requires that the system take a key element from the user interface and come up with all information pertaining to that particular business document.

In an embodiment, to design the middle tier elements for implementing the system response for a user interaction, the designer specifies the type of user action, the user interface controls that are involved in this action, and the expected behavior of the system. The expected response of the system is specified as binary logic (Yes/No) to a variety of questions (e.g., whether refresh is required, related combo to be filled, etc.) This information is stored in the model. Design generators then use this model information to generate the service interfaces and method interfaces, and invoking back end objects interfaces also, to generate the sequence of these method calls. A facility is provided to override these interfaces to do a dataset reduction of the interface elements of the methods. The design generators take care of passing the appropriate parameters across the different layers.

The salient advantages of this pattern based design are the resulting simplified interface and sequence specifications across layers. This simplified procedure enables the design work to be done by non-specialists who have an understanding of the application. Second, automated plumbing of interfaces across different software artifacts in different layers leads to reduced defects in terms of interface mismatches. Third, there is standardized design across the entire development team leading to better maintainability. This helps reduce the dependency of persons to either enhance the product or fix defects. Fourth, there is reduced time for design specifications leading to better productivity. Since the middle layer design is driven by expected response it does not require any special skills and can be effectively done by a business user also.

Figure 2:
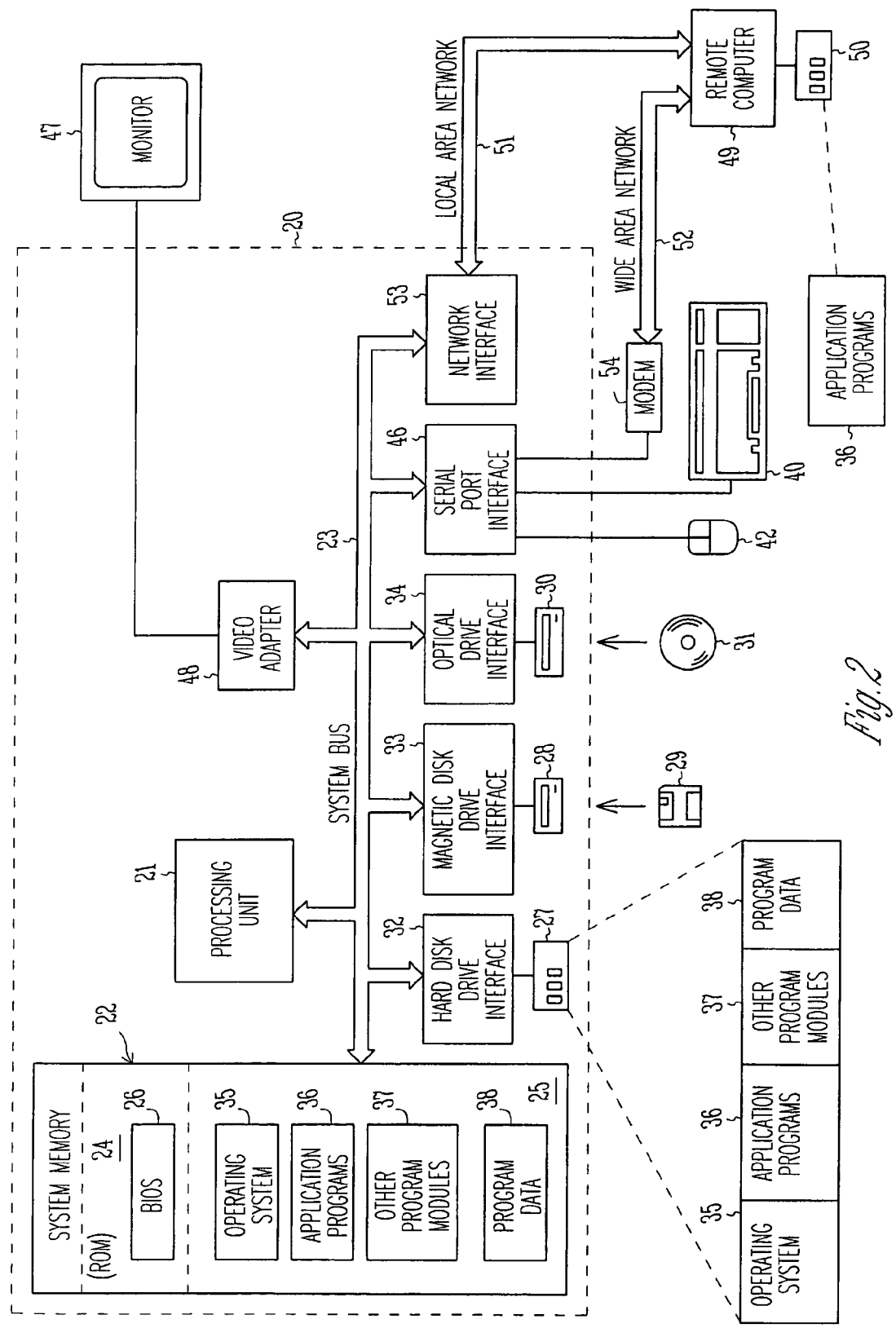
FIG. 2 illustrates a computer system that may be used in connection with the present invention.

FIG. 2 is an overview diagram of a hardware and operating environment in conjunction with which embodiments of the invention may be practiced. The description of FIG. 2 is intended to provide a brief, general description of suitable computer hardware and a suitable computing environment in conjunction with which the invention may be implemented. In some embodiments, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computer environments where tasks are performed by I/O remote processing devices that are linked through a communications network. In a distributed computing environment, program modules may be located in both local and remote memory storage devices.

In the embodiment shown in FIG. 2, a hardware and operating environment is provided that is applicable to any of the servers and/or remote clients shown in the other Figure.

As shown in FIG. 2, one embodiment of the hardware and operating environment includes a general purpose computing device in the form of a computer 20 (e.g., a personal computer, workstation, or server), including one or more processing units 21, a system memory 22, and a system bus 23 that operatively couples various system components including the system memory 22 to the processing unit 21. There may be only one or there may be more than one processing unit 21, such that the processor of computer 20 comprises a single central-processing unit (CPU), or a plurality of processing units, commonly referred to as a multiprocessor or parallel-processor environment. In various embodiments, computer 20 is a conventional computer, a distributed computer, or any other type of computer.

The system bus 23 can be any of several types of bus structures including a memory bus or memory controller, a peripheral bus, and a local bus using any of a variety of bus architectures. The system memory can also be referred to as simply the memory, and, in some embodiments, includes read-only memory (ROM) 24 and random-access memory (RAM) 25. A basic input/output system (BIOS) program 26, containing the basic routines that help to transfer information between elements within the computer 20, such as during start-up, may be stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non volatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 29, optical disk 31, ROM 24, or RAM 25, including an operating system 35, one or more application programs 36, other program modules 37, and program data 38. A plug in containing a security transmission engine for the present invention can be resident on any one or number of these computer-readable media.

A user may enter commands and information into computer 20 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 40 can display a graphical user interface for the user. In addition to the monitor 40, computers typically include other peripheral output devices (not shown), such as speakers and printers.

The computer 20 may operate in a networked environment using logical connections to one or more remote computers or servers, such as remote computer 49. These logical connections are achieved by a communication device coupled to or a part of the computer 20; the invention is not limited to a particular type of communications device. The remote computer 49 can be another computer, a server, a router, a network PC, a client, a peer device or other common network node, and typically includes many or all of the elements described above I/O relative to the computer 20, although only a memory storage device 50 has been illustrated. The logical connections depicted in FIG. 2 include a local area network (LAN) 51 and/or a wide area network (WAN) 52. Such networking environments are commonplace in office networks, enterprise-wide computer networks, intranets and the internet, which are all types of networks.

When used in a LAN-networking environment, the computer 20 is connected to the LAN 51 through a network interface or adapter 53, which is one type of communications device. In some embodiments, when used in a WAN-networking environment, the computer 20 typically includes a modem 54 (another type of communications device) or any other type of communications device, e.g., a wireless transceiver, for establishing communications over the wide-area network 52, such as the internet. The modem 54, which may be internal or external, is connected to the system bus 23 via the serial port interface 46. In a networked environment, program modules depicted relative to the computer 20 can be stored in the remote memory storage device 50 of remote computer, or server 49. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

In the foregoing detailed description of embodiments of the invention, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the detailed description of embodiments of the invention, with each claim standing on its own as a separate embodiment. It is understood that the above description is intended to be illustrative, and not restrictive. It is intended to cover all alternatives, modifications and equivalents as may be included within the spirit and scope of the invention as defined in the appended claims. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

The invention claimed is:

1. A method of identifying pattern signatures in a model based software system for reuse in one or more model based software systems, said method comprising:
   providing a set of business rules for each business component in a business process of said model based software system by a processor, wherein said set of business rules provides a business logic used in each business component, and wherein said set of business rules includes a sequence of business rules associated with each action performed by an end user;
   scanning said sequence of business rules associated with each action in said model based software system by said processor;
   forming a first pattern signature associated with an action that uniquely identifies each business rule of said sequence of business rules based on said scanning by said processor;
   determining if said first pattern signature is present in other actions in said model based software system by said processor;
      if present, including said first pattern signature in a set of pattern signatures of said model based software system by said processor; and
      if not present, repeating the step of determining for a second pattern signature that is a subset of said first pattern signature by said processor;
   repeating said steps of forming and determining for each action in said model based software system by said processor;
   analyzing said set of pattern signatures by said processor;
   identifying similarities in said set of pattern signatures by said processor; and
   identifying said set of pattern signatures that can be reused in said one or more model based software systems based on said similarities in said set of pattern signatures by said processor.

2. The method of claim 1, wherein said scanning is sequential.

3. The method of claim 1, further comprising identifying said second pattern signature that is said subset of said first pattern signature.

4. The method of claim 3, further comprising recording a hierarchy of said first pattern signature and said second pattern signature.

5. The method of claim 1, further comprising selecting from said set of pattern signatures a pattern signature with a maximum size, thereby maximizing reuse of said set of business rules.

6. The method of claim 1, further comprising selecting a pattern signature covering a maximum number of actions in said model based software system.

7. The method of claim 1, further comprising recording occurrences of said first pattern signature.

8. A method of identifying pattern signatures in a model based software system for reuse in one or more model based software systems, said method comprising:

providing a set of business rules for each business component in a business process of said model based software system by a processor, wherein said set of business rules provides a business logic used in each business component, and wherein said set of business rules includes a sequence of business rules associated with each action performed by an end user;

scanning said sequence of business rules associated with each action in said model based software system by said processor;

extracting descriptions of said sequence of business rules based on said scanning by said processor, wherein said descriptions include content and a business logic of said sequence of business rules;

forming a first pattern signature associated with an action that uniquely identifies each business rule of said sequence of business rules based on said descriptions of said sequence of business rules by said processor;

determining if said first pattern signature is present in other actions in said model based software system by said processor;

if present, including said first pattern signature in a set of pattern signatures of said model based software system by said processor; and if not present, repeating the step of determining for a second pattern signature that is a subset of said first pattern signature by said processor;

repeating said steps of forming and determining for each action in said model based software system by said processor;

analyzing said set of pattern signatures by said processor;

identifying similarities in said set of pattern signatures by said processor; and identifying said set of pattern signatures that can be reused in said one or more model based software systems based on said similarities in said set of pattern signatures by said processor.

9. The method of claim 8, wherein said scanning is sequential.

10. The method of claim 8, further comprising identifying said second pattern signature that is said subset of said first pattern signature.

11. The method of claim 10, further comprising recording a hierarchy of said first pattern signature and said second pattern signature.

12. The method of claim 8, further comprising selecting a pattern signature with a maximum size, thereby maximizing reuse of said set of business rules.

13. The method of claim 8, further comprising selecting a pattern signature covering a maximum number of actions in said model based software system.

14. The method of claim 8, further comprising recording occurrences of said first pattern signature.

15. An article comprising a non-transitory storage medium storing instructions that, when executed by a computing platform, result in execution of a method of identifying pattern signatures in a model based software system for reuse in one or more model based software systems, said method comprising:

receiving a set of business rules for each business component in a business process of said model based software system by a processor, wherein said set of business rules provides a business logic used in each business component, and wherein said set of business rules includes a sequence of business rules associated with each action performed by an end user;

scanning said sequence of business rules associated with each action in said model based software system by said processor;

forming a first pattern signature associated with an action that uniquely identifies each business rule of said sequence of business rules based on said scanning by said processor;

determining if said first pattern signature is present in other actions in said model based software system by said processor;

if present, including said first pattern signature in a set of pattern signatures of said model based software system by said processor; and if not present, repeating the step of determining for a second pattern signature that is a subset of said first pattern signature by said processor;

repeating said steps of forming and determining for each action in said model based software system by said processor;

analyzing said set of pattern signatures by said processor;

identifying similarities in said set of pattern signatures by said processor; and identifying said set of pattern signatures that can be reused in said one or more model based software systems based on said similarities in said set of pattern signatures by said processor.

16. The article of claim 15, wherein said scanning is sequential.

17. The article of claim 15, further comprising instructions for recording occurrences of said first pattern signature.

18. The article of claim 15, further comprising instructions for identifying said second pattern signature that is said subset of said first pattern signature.

19. The article of claim 18, further comprising instructions for recording a hierarchy of said first pattern signature and said second pattern signature.

20. The article of claim 15, further comprising instructions for selecting from said set of pattern signatures a pattern signature with a maximum size, thereby maximizing reuse of said set of business rules.

21. The article of claim 15, further comprising instructions for selecting a pattern signature covering a maximum number of actions in said model based software system.

22. An article comprising a non-transitory storage medium storing instructions that, when executed by a computing platform, result in execution of a method of identifying pattern signatures in a model based software system for reuse in one or more model based software systems, said method comprising:

receiving a set of business rules for each business component in a business process of said model based software system by a processor, wherein said set of business rules provides a business logic used in each business component, and wherein said set of business rules includes a sequence of business rules associated with each action performed by an end user;

scanning said sequence of business rules associated with each action in said model based software system by said processor;

extracting descriptions of said sequence of business rules based on said scanning by said processor, wherein said descriptions include content and a business logic of said sequence of business rules;

forming a first pattern signature associated with an action that uniquely identifies each business rule of said sequence of business rules based on said descriptions of said sequence of business rules by said processor;

determining if said first pattern signature is present in other actions in said model based software system by said processor;
   if present, including said first pattern signature in a set of pattern signatures of said model based software system by said processor; and
   if not present, repeating the step of determining for a second pattern signature that is a subset of said first pattern signature by said processor;
repeating said steps of forming and determining for each action in said model based software system by said processor;
analyzing said set of pattern signatures by said processor;
identifying similarities in said set of pattern signatures by said processor; and
identifying said set of pattern signatures that can be reused in said one or more model based software systems based on said similarities in said set of pattern signatures by said processor.

23. The article of claim 22, wherein said scanning is sequential.

24. The article of claim 22, further comprising instructions for recording occurrences of said first pattern signature.

25. The article of claim 22, further comprising instructions for identifying said second pattern signature that is said subset of said first pattern signature.

26. The article of claim 25, further comprising instructions for recording a hierarchy of said first pattern signature and said second pattern signature.

27. The article of claim 22, further comprising instructions for selecting a pattern signature with a maximum size, thereby maximizing reuse of said set of business rules.

28. The article of claim 22, further comprising instructions for selecting a pattern signature covering a maximum number of actions in said model based software system.

\* \* \* \* \*